UNITED STATES PATENT OFFICE.

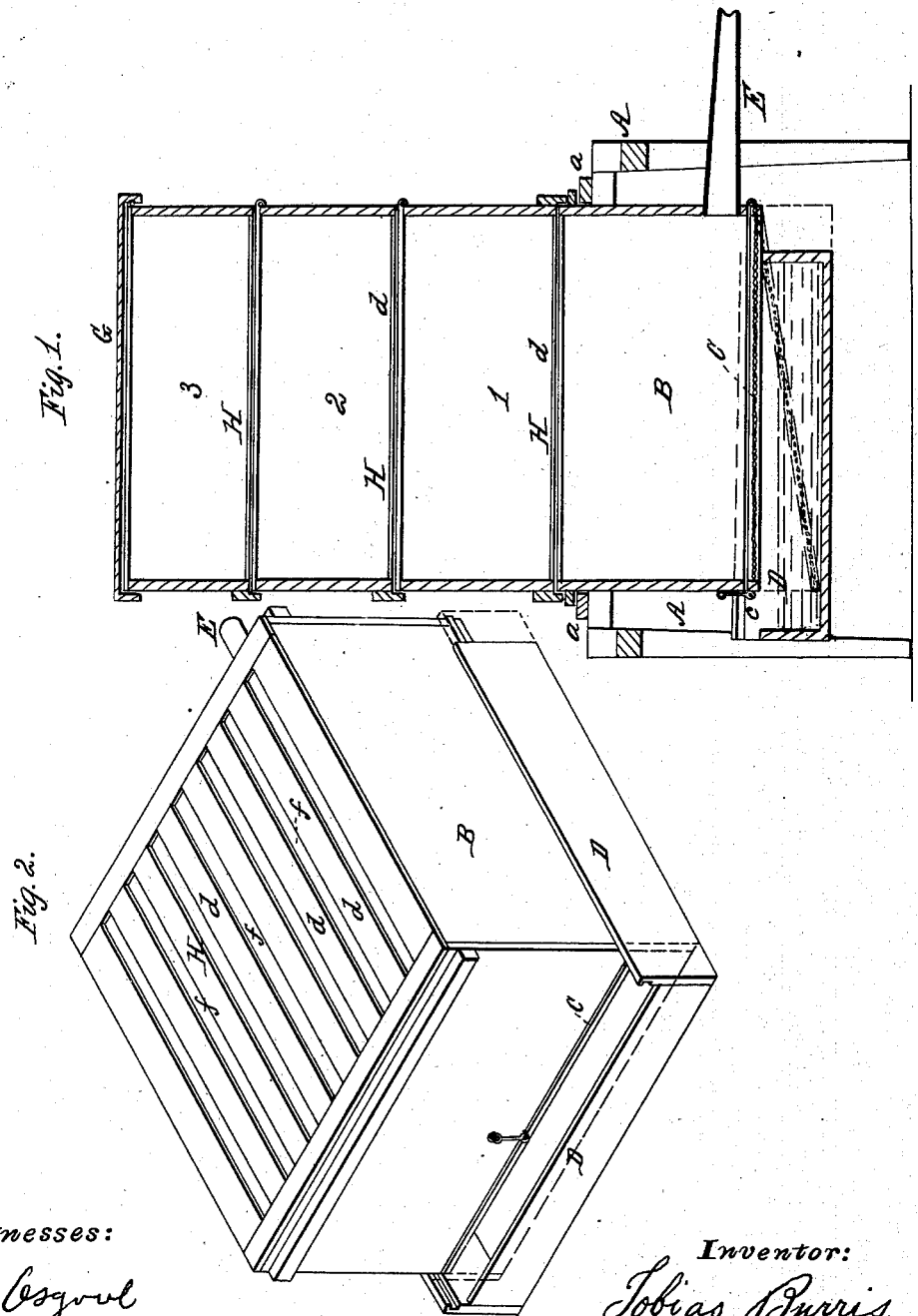

TOBIAS BURRIS, OF FIELDON, ILLINOIS.

IMPROVEMENT IN BEE-HIVES.

Specification forming part of Letters Patent No. 49,375, dated August 15, 1865.

*To all whom it may concern:*

Be it known that I, TOBIAS BURRIS, of Fieldon, in the county of Jersey and State of Illinois, have invented a new and useful Improvement in Bee-Hives; and I do hereby declare that the following is a full and exact description thereof, reference being had to the accompanying drawings, making part of this specification.

Figure 1 is a central vertical section of my improved hive, with accompanying honey-boxes; Fig. 2, a perspective view of the hive proper detached.

Like letters of reference indicate corresponding parts in both figures.

My invention consists of a trap at the bottom of the hive, consisting of an adjusting box or drawer filled with oil, or equivalent semi-liquid, employed in combination with a hinged or removable perforated bottom to the hive, and a long tube through which the bees enter, but which excludes the moth-miller.

As represented in the drawings, A is a supporting-frame of any desirable construction, within which rests one or more hives, B, sustained by cross-pieces *a a*. The hive B may be of any desired form or construction, but I prefer that represented in the drawings, consisting of a square box of proper size.

At the base of the hive is situated a bottom, C, which may be made of wire-cloth or perforated metal, or in any other manner, so that a perforated covering is produced, the perforations being so small as to prevent the passage through of either the moth-miller or the bees, but which will still allow the odor of the honey to pass down through to attract the miller, and will allow free and unobstructed ventilation. I prefer to hinge one side of this bottom, so that it may be turned down, as indicated by red lines, Fig. 1, but instead it may be removable by sliding in or out, or otherwise. Beneath this perforated bottom is situated an adjustable drawer or receptacle, D, which is preferably made to slide in and out under the hive by means of a tongue and groove, *b c*, or equivalent, that retain the two parts together. This drawer is filled with oil or other sticky liquid nearly up to the perforated bottom. At a little distance above the perforated bottom a tube, E—say a foot (more or less) in length, and of such size as only to allow the bees to pass in and out easily—opens into the hive. By this combined arrangement of the oil-drawer, removable perforated bottom, and passage-tube several important advantages are gained: The moth-miller, attracted by the odor of honey, will seek entrance into the bottom of the hive, and, no other being found, will pass in at the open end of the oil-drawer, (which at night is drawn out a little distance, as indicated by black lines, Fig. 1,) where, coming in contact with the oil which fills the drawer nearly to the perforated bottom, it becomes hopelessly stuck and cannot escape. The oil-drawer thus answers as a perfect trap for the miller, and is one of the simplest and cheapest devices that can be devised for the purpose. The perforated bottom not only allows the odor of the honey and comb to pass through, but also serves as a ventilator, insuring a free supply of fresh air at all times; and not only this, but, by being removable or adjustable, it allows the interior of the hive to be examined easily and to be cleaned readily; and by the employment of the long passage-tube to the hive the miller is excluded, while the bees themselves find ready access. I am not aware of any similar arrangement and combination of the oil-drawer, perforated bottom, and passage-tube.

On top the hive B may be placed, one above another, any suitable number of honey-boxes, 1 2 3, &c., with a cap or roof, G, covering the upper one. The form of these boxes may be similar to that of the hive, and in order to maintain suitable communication from the bottom to the top I provide the hive and boxes with covers H H, made up of alternate slats *d d* and intermetiate openings *f f*, as shown most clearly in Fig. 2.

What I claim as my invention, and desire to secure by Letters Patent, is—

The combination of the oil-drawer or receptacle D, perforated bottom C, and passage-tube E with the hive B, substantially as and for the purpose herein set forth.

In witness whereof I have hereunto set my hand this 27th day of March, 1865.

TOBIAS BURRIS.

Witnesses:
WILLIAM W. FELTER,
R. F. OSGOOD.